United States Patent [19]

Laurie et al.

[11] 4,291,443

[45] Sep. 29, 1981

[54] FORMING EXPANDED MESH SHEET FROM DEFORMABLE STRIP

[75] Inventors: Gordon H. Laurie, Mississauga; Theodore J. Seymour, Oakville; Randall T. Sakauye, Mississauga; John V. Marlow, Oakville, all of Canada

[73] Assignee: Cominco Ltd., Vancouver, Canada

[21] Appl. No.: 970,298

[22] Filed: Dec. 18, 1978

[30] Foreign Application Priority Data

Oct. 31, 1978 [CA] Canada .................................. 315190

[51] Int. Cl.³ ............................................ B21D 31/04
[52] U.S. Cl. ...................................................... 29/6.1
[58] Field of Search ...................... 29/6.1, 6.2, 163.5 R

[56] References Cited
U.S. PATENT DOCUMENTS 1,195,222  8/1916  Herr ....................................... 29/6.1
1,212,863  1/1917  White ..................................... 29/6.2
1,818,246  8/1931  Galbreath ............................... 29/6.1

Primary Examiner—Z. R. Bilinsky
Attorney, Agent, or Firm—Arne I. Fors; Robert F. Delbridge

[57] ABSTRACT

A method and an apparatus are disclosed for forming expanded mesh sheet from deformable strip by the steps of concurrently slitting and preforming the strip to provide transverse bands of slit and elongated wire segments projecting alternately from opposite sides of the plane of the strip separated by transverse bands of unslit strip, slitting the strip at alternate bands to extend slit segments in a staggered relation and laterally expanding the slit and preformed strip. Concurrent slitting and preforming and subsequent slitting can be effected by a cluster of three rolls or by a linear arrangement of pairs of opposed rolls.

The invention has particular utility in forming expanded mesh sheet of exact final dimensions for use as battery grids from lead or lead alloy strip.

6 Claims, 18 Drawing Figures

FORMING EXPANDED MESH SHEET FROM DEFORMABLE STRIP

BACKGROUND OF THE INVENTION

The process and apparatus of the present invention relate to the rapid production of expanded mesh sheet, e.g., the expansion of a portion of metal strip contained within unexpanded imperforate border portions for the manufacture of grids, particularly grids used in pasted battery electrodes.

In conventional preparation of strip by rotary slitting to permit lateral expansion which forms a network of meshes, e.g., the method shown in FIGS. 8 and 9 of U.S. Pat. No. 1,472,769, longitudinally aligned slits arranged in a staggered relation may be cut into a strip by engagement between a pair of opposed rolls, each roll comprising spaced discs having circular cutting edges interrupted by recesses which are spaced circumferentially. On rotation of the rolls, recesses in the discs of one roll become aligned with like recesses in the discs of the other roll to leave spaced unslit portions of strip which become nodes having bonds that join adjacent strand-like components in the staggered relation. In this slitting operation, the discs of one roll press alternate strand-like components out of the plane of the strip in one direction while the discs of the other roll press intervening strand-like components out of the plane of the strip in the opposite direction. Some bending and stretching of bonds connecting adjacent strand-like components occur in this operation, and during lateral expansion to provide a network of meshes, to impose additional forces on the bonds. If the network of meshes is to be contained within unexpanded imperforate border portions, preforming or elongation of the strand-like components is required to compensate for shortening during expansion of the slit area relative to the border portions. Otherwise irregular ripples will form in the imperforate borders or these borders will require corrugation to provide uniform shortening to the length of mesh portion. In the slitting, preforming and lateral expansion in successive steps of strip material, particularly strip material having low tensile strength such as lead or lead alloys, bonds between strand-like components may become points of weakness which can be prone to failure during subsequent use.

The method of U.S. Pat. No. 1,472,769 provides zones of expanded metal between non-expanded longitudinal strips or ribs without shortening the slit portion of strip. Strip is slit as previously described, then flattened into the original plane. Flattened strip moves between corrugating rolls which coact to press alternate series of bonds, i.e. rows of bonds connecting laterally adjacent components, out of the plane of the strip. This causes strands to be stretched and to be inclined laterally. Divergence of the side strips opens meshes which are then flattened. It is considered undesirable to stretch the strands by a single operation to a sufficient length to accommodate a full lateral expansion of the meshes. Use of successive corrugating and expanding operations overcomes resilience of the metal. Final flattening of the expanded meshes sets the corrugated bonds and inclined strands in a common plane.

In the method of U.S. Pat. No. 1,212,863, stretching of components in a slit portion of strip is effected by moving alternate nodes of each component out of the plane of the strip. Successively acting dies provide both slitting and stretching as the strip advances. Since the dies act successfully, the strip must be moved through the assembly intermittently.

U.S. Pat. No. 1,205,299 illustrates, in FIG. 3, feed rolls comprising discs which taper into relatively thin peripheral edges made up of uniform and regularly alternating notches and gripping projections. These rolls, although similar in longitudinal section to slitting and preforming rolls of the present invention, are used solely to help control the movement of strip which has been slit and expanded intermittently in a preceding die press.

Elongation of strands preslit by rotary cutting and subsequent lateral expansion often leads to breakage of the strands due to excessive stretching or to failure of the strands at node bonds due to concentration of stresses at the nodes.

In the forming of meshes from strip by reciprocal techniques, e.g. the method of U.S. Pat. No. 1,482,600, stretching of bonds between adjacent strand-like components occurs during progressive slitting and opening of meshes using reciprocating cutting tools wherein individual wire segments are cut from strip and stretched out of the plane of the strip by the reciprocating cutters. Twisting of nodes during deformation by the reciprocating cutting tools and subsequent bending as meshes are brought into the plane of expanded sheet impose stresses on the nodal bonds joining the strand-like components. Product having imperforate borders may be obtained by the reciprocating technique but this method is sensitive to changes in strip material dimensions which can adversely affect final dimensions and is limited in speed of production.

SUMMARY OF THE INVENTION

In the method of the present invention, a concurrent slitting and preforming operation provides a plurality of longitudinally extending components comprising slit segments elongated by deformation out of the plane of the strip and unslit segments retained in the plane of the strip. The unslit segments together define continuous bands extending laterally across a portion of the strip contained between longitudinally extending edge portions of the strip. Since these bands contain all the bonds which connect adjacent components, these bonds are not undesirably deformed as slit segments are moved out of the plane of the strip to provide meshes extending substantially normal to the plane of the strip. The above-mentioned elongation of wire segments out of the plane of the strip concurrent with slitting compensates for edge shortening that would otherwise occur in the subsequent lateral expansion of the strip. In a second slitting step, the slits are extended in a staggered relation through alternate bands to permit lateral expansion of the slit portion of the strip. Because of the holding of the bands containing all the bonds during slit segment elongation before the completion of slitting, desired preferential concurrent elongation of the slit segments as they are formed is achieved, substantially avoiding rupture of the strands during mesh expansion or failure of strands at node bonds. These node bonds remain substantially in the plane of the strip during the expansion.

The mesh sheet can be produced rapidly from continuously moving strip to exact final dimensions independent of strip material dimensions and composition.

The method and apparatus of our invention which thus substantially overcome disadvantages inherent in conventional rotary and reciprocating methods, comprise essentially the steps of concurrently slitting and preforming at least a portion of strip contained within imperforate border portions to provide one or more longitudinally extending strand-like components, said components comprising elongated slit segments deformed out of the plane of the strip and unslit segments retained in the plane of the strip, said elongated slit segments being severed from laterally adjacent segments and said border portions and substantially convexly shaped from the plane of the strip whereby slit segments in laterally adjacent components extend from opposite sides of the plane of the strip, and said unslit segments retained in the plane of the strip together define continuous bands extending laterally at least the width of said one or more strand-like components across the said portion of the strip; slitting the strip at alternate bands to extend the slit segments in a staggered relation; and laterally expanding the slit preformed portion of the strip to form meshes by drawing opposite longitudinal edges of the strip apart whereby the elongated segments form a network of substantially flattened meshes joined by nodes wherein unslit portions of the bands provide bonds between adjacent components.

BRIEF DESCRIPTION OF THE DRAWINGS

The method and apparatus of the present invention will now be described in detail, reference being made to the following drawings wherein.

Like reference characters refer to like parts throughout the description of the drawings.

DESCRIPTION OF PREFERRED EMBODIMENTS

Figure 1:
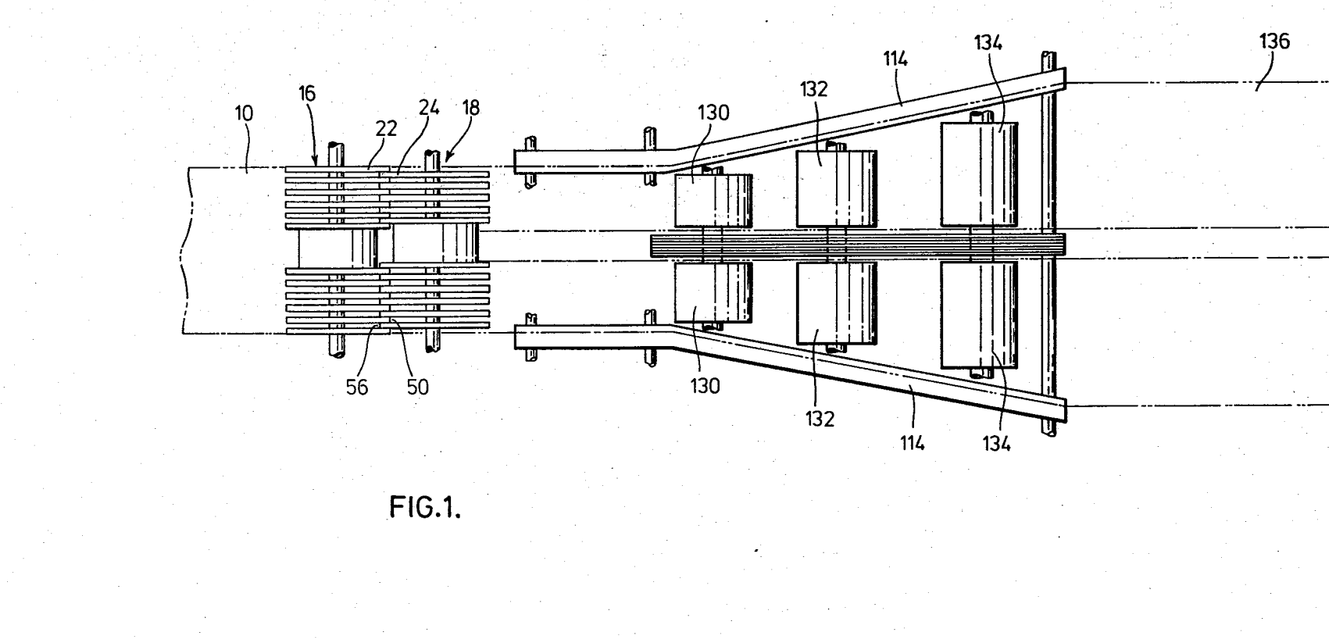
FIG. 1 is a plan of the apparatus.
Figures 2, 18:
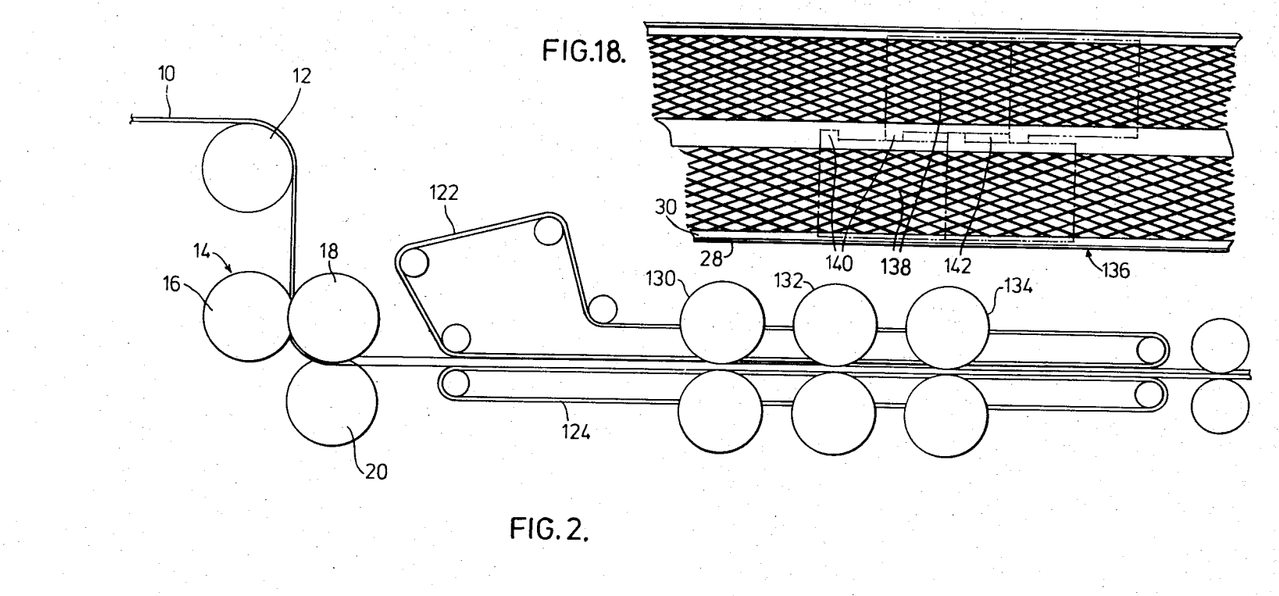
FIG. 2 is a side elevation of the apparatus.
FIG. 18 is a plan sketch of completely slit and expanded sheet before cutting to make battery grids.
Figures 3, 11:
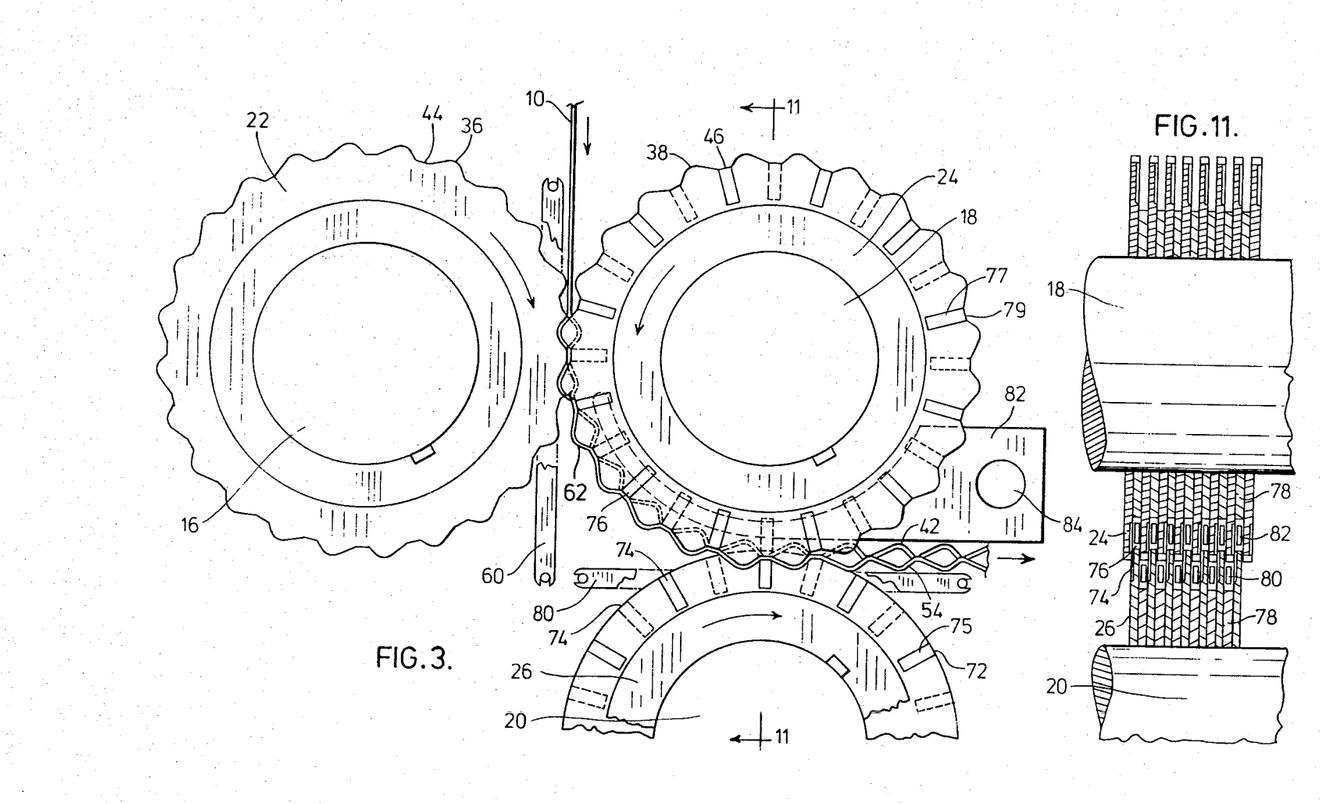
FIG. 3 is a side elevation of a modification of the slitting and preforming assembly wherein a cluster of three rolls is used.
FIG. 11 is an end elevation on line 11—11 of FIG. 3 showing engagement of discs to complete slitting of preformed strip.

As shown in FIGS. 1 to 3, strip 10 passes over guide roll 12 and enters vertically into slitting and preforming assembly 14 comprising a cluster of three rolls 16, 18 and 20, each roll having a plurality of spaced discs 22, 24 and 26 respectively. The discs have tooled peripheral edges. Moving strip is engaged successively between first and second rolls 16 and 18 and between second and third rolls 18 and 20. Rolls 16 and 18 act on rapidly advancing strip to provide upturned edges 28, FIG. 6, in lateral edge portions 30 for engagement with expansion means, and to hold bands 32 extending between a central portion 34 of the strip and lateral portions 30 while substantially convexly shaped tool surfaces 36 of discs 22 engage like tool surfaces 38 of discs 24 to slit portions 40 of strip 10 between bands 32 and elongate slit segments 42 out of the plane of the strip. Tool surfaces 36 and 38 alternate with substantially flat portions 44 and 46 on their respective rolls and are equally spaced circumferentially to provide interacting peripheral surfaces as the rolls rotate. During rotation of the rolls, convexly shaped tool portions 36 of a disc 22 of first roll 16 are engaged by convexly shaped tool portions 38 of adjacent discs 24 of second roll 18 to provide longitudinal slits as the curved surfaces 36 penetrate through the plane of the strip to stretch slit segments 42 between slits 48 into spaces 50 which are between adjacent discs 24 of second roll 18. Then, substantially flat portions 44 and 46 of the discs of both rolls become circumferentially aligned and spaced from each other to hold unslit segments which together form laterally extending bands 32. In the same manner, convexly shaped tool portions 38 of a disc 24 of second roll 18 penetrate through the plane of the strip in the opposite direction to stretch slit segments 54 into spaces 56 between adjacent first roll discs 22, on the opposite side of the plane of strip 10. In line with each disc 22 there is formed in the strip a component 58, FIG. 7, comprising slit segments 42 deformed out of the plane of the strip in one direction spaced by unslit segments 52 retained in the plane of the strip. These components alternate with like components in line with each disc 24 and having slit segments 54 deformed out of the plane of the strip in the opposite direction. The unslit segments of all the components together define continuous bands 32 extending across the flat portions 44 and 46 of discs 22 and 24 respectively.

Figure 7:
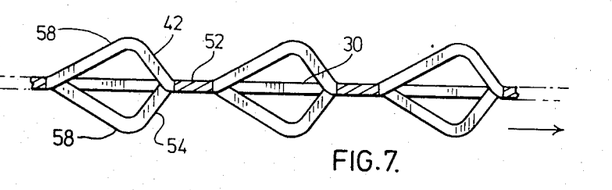
FIG. 7 is an enlarged side elevation of a slit and preformed portion of strip showing a modification in which elongated slit segments are asymmetrically shaped.
Figure 8:
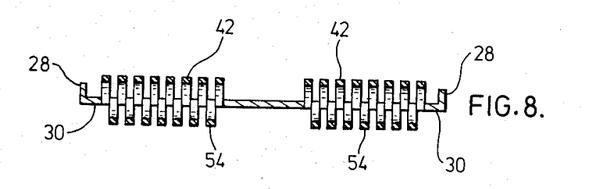
FIG. 8 is a section of slit and preformed strip viewed along line 8—8 of FIG. 6.
Figure 9:
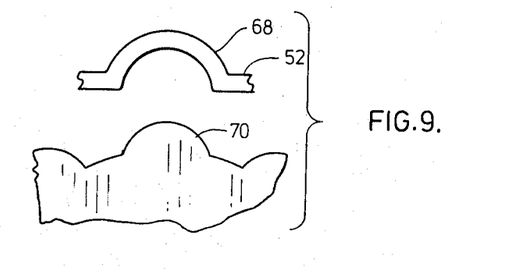
FIG. 9 is an enlarged section of a strip component having a symmetrically curved slit segment and showing a portion of a related tool disc.

As the strip leaves the area of engagement of rolls 16 and 18, a set of stripper bars 60 assures separation of preformed strip from first roll 16. Preformed strip 62, FIG. 10, has upturned edges 28 in lateral edge portions 30, central unslit portion 34 and intermediate slit and preformed portions 64 and 66 each comprising longitudinally extending strip components 58. Each strip component 58, FIG. 7, has elongated slit segments 42 or 54 alternating with unslit segments 52. Slit segments 42 of alternate components 58 extend from one side of the plane of the strip while slit segments 54 of laterally adjacent components 58 extend from the other side of the plane of the strip. In the modification as shown in FIG. 7, slit segments 42 and 54 are asymmetrically shaped and are formed by correspondingly shaped tool surfaces 36 and 38 in FIG. 3. This structure is shown in lateral cross section in FIG. 8. In a simpler modification of the invention, FIG. 9, strip components 58 have symmetrically shaped elongated slit segments 68, formed by correspondingly curved tool surfaces 70 of discs 22 and 24. This form is shown in perspective in FIG. 10.

Figures 10, 15:
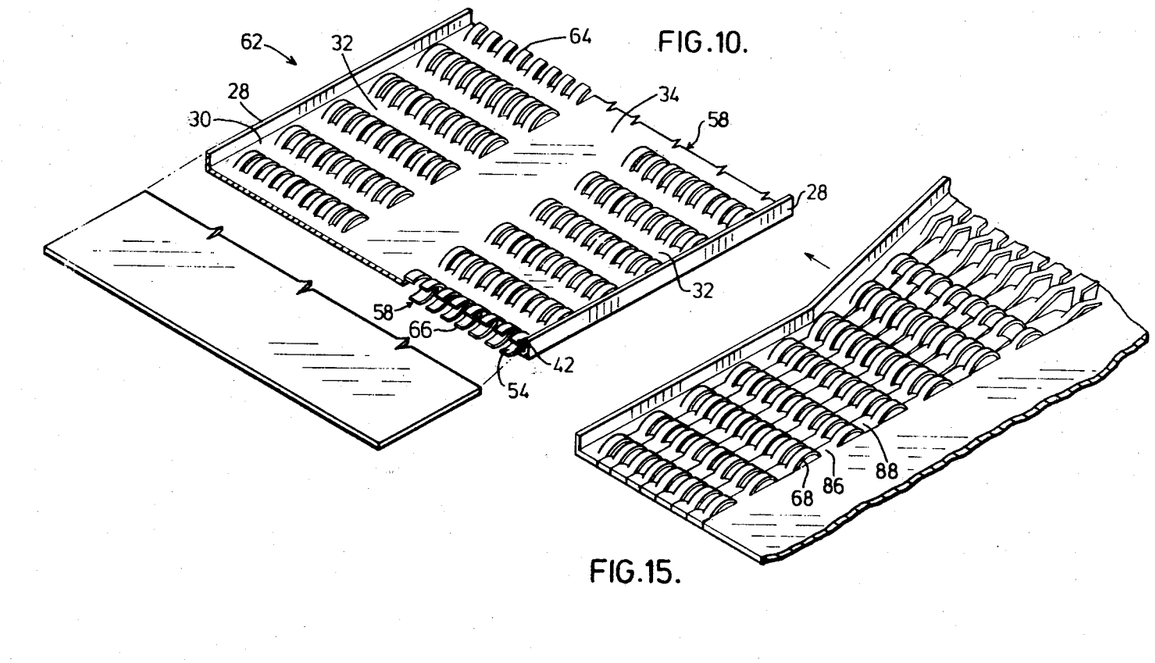
FIG. 10 is a perspective view of the strip as it leaves the slitting and preforming assembly showing slit segments offset from laterally adjacent slit segments.
FIG. 15 is a perspective view of the strip as shown in part of FIG. 13.

FIG. 10 also shows a modification of the invention which may be used when two or more portions across the width of the strip are slit and preformed. In the providing of laterally extending bands 32 and slit segments 42 and 54 in the slitting and preforming operation, the cutting forces alternate between minimum when flat portions 44 and 46 become circumferentially aligned to hold bands 32 and maximum when tool surfaces 36 and 38 penetrate the strip. This cycle change between cutting and not cutting of the strip causes vibration in the roll drive means. The vibration may increase as strip is moved more rapidly through the assembly. In the slitting of portions 64 and 66 of the strip it is advantageous for the tool surfaces which engage portions 64 to be out of phase with the tool surfaces which engage portion 66. Then, as a set of laterally aligned tool surfaces initiates penetration into mesh area 64 another set of laterally aligned tool surfaces is completing the formation of slit segments in mesh area 66 and approaching engagement of bands 32. Cutting forces are more uniformly distributed during rotation and smoother operation results. If more than two portions of strip are slit and preformed, circumferential distribution of the points of entry will provide still smoother operation.

Figures 4, 12:
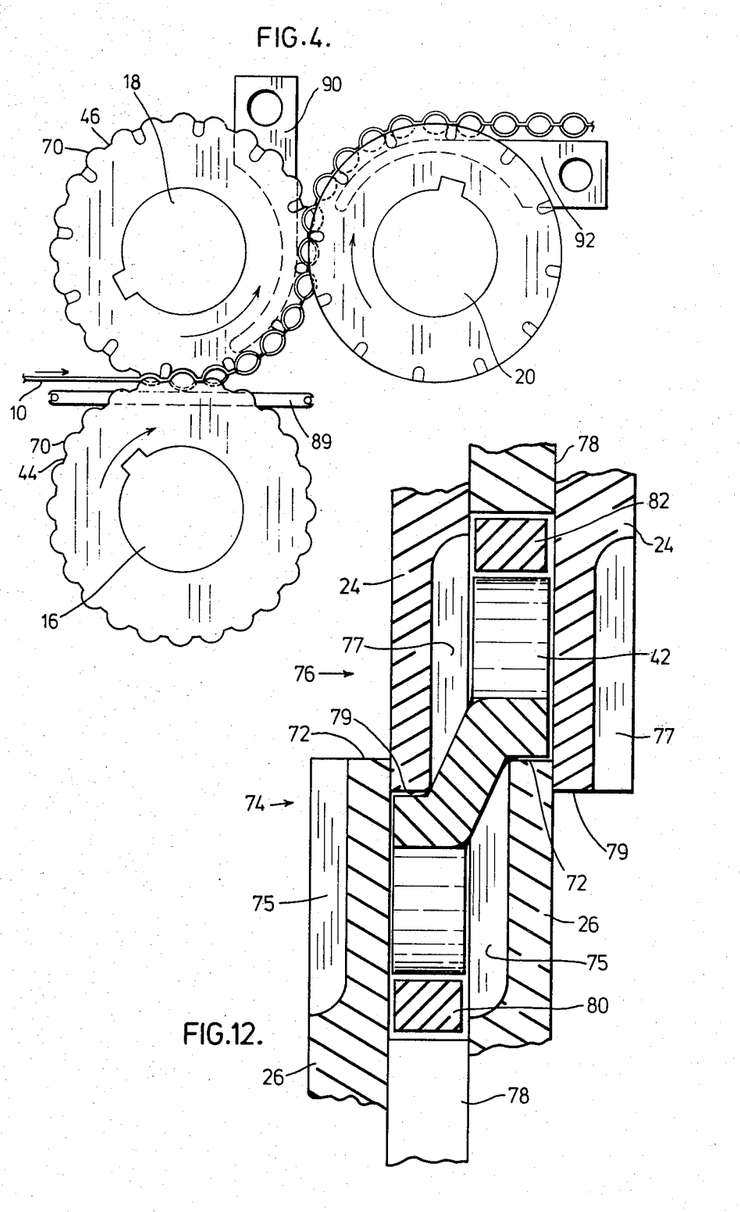
FIG. 4 is a side elevation of another modification of the slitting and preforming assembly wherein a cluster of three rolls is used.
FIG. 12 is an enlarged end elevation on line 11—11 of FIG. 3.

On being released from roll 16, preformed strip 62 follows second roll 18 for a convenient distance, e.g. a quarter turn as shown in FIG. 3, to an area of engagement of second roll 18 and third roll 20 which has spaced discs 26 with disc components 74 consisting of effective cutting edges 72 and recesses 75, FIGS. 3, 11 and 12, which are spaced circumferentially to align, on alternate sides, on rotation of the rolls, with like disc components 76 consisting of recesses 77 and cutting edges 79 in discs 24 of second roll 18 which extend circumferentially from alternate flat portions 46 to permit passage, without slitting, of alternate bands in each line of slits formed between adjacent components 58 by engagement of the first and second rolls. Like recesses 75 or 77 occur in alternating positions in the opposite faces of the discs of both the second and third rolls. Cutting edges 72 of the disc peripheries penetrate through the strip to extend the slits 48 through alternate bands 32 in a staggered relation, thus completing two-step slitting, which permits lateral divergence of strip edges to form diamond-shaped meshes. FIG. 11 also shows relative small diameter spacer discs 78 which are placed between adjacent discs 22, 24 and 26 of the three rolls.

Figure 6:
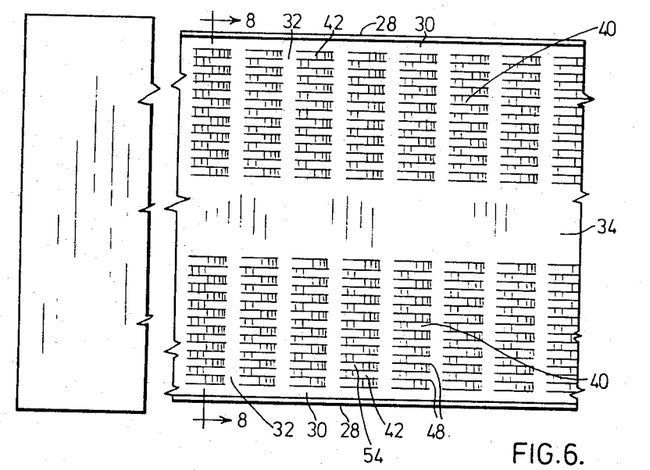
FIG. 6 is a plan of strip after passing through the slitting and preforming assembly.

As the strip leaves the area of engagement of the second and third rolls 18 and 20, a set of stripper bars 80 guides the preformed and completely slit strip away from the third roll, and a set of stripper plates 82 supported on an adjacent shaft 84 and restrained against rotation project into the spaces between adjacent discs of the second roll to guide elongated slit segments 42 away from the second roll. Since the strip never leaves the second roll while moving through the assembly, good registry of the strip with all cutting and preforming tool faces is maintained. Thus slits 48 in FIG. 6 are alternately extended to provide the staggered pattern of slits 86 in FIG. 13 in a manner which avoids cutting into and weakening of intermediate bonds 88 between adjacent components. Completely slit and preformed strip, partially expanded, is shown in perspective in FIG. 15.

In the modification of the foregoing description, strip is moved vertically for engagement between the first and second rolls, follows the second roll through a quarter turn, and moves horizontally between the second and third rolls. Guide roll 12 directly above first roll 16 may be used to direct horizontally moving strip into the slitting and preforming assembly. In another modification, FIG. 4, second roll 18 is placed above first roll 16. Strip 10 moving horizontally between first and second rolls 16 and 18 follows the second roll through a quarter turn for engagement between second roll 18 and third roll 20 and then follows the third roll through a quarter turn to exit horizontally. A set of stripper bars 89 assures separation of performed strip from first roll 16, but, since passage of strip interferes with two ended mounting of stripper bars, sets of stripper plates 90 and 92 are used to guide preformed and completely slit strip away from second roll 18 and third roll 20 respectively. Symmetrically curved tool surfaces 70 are shown in FIG. 4.

According to the modification shown in FIG. 3, forming of upturned edges can be effected between the first and second rolls. These upturned edges are bent only once, as the strip changes direction to follow the second roll. Upturned edges can be formed between the last pair of opposed rolls to avoid bending of the edges. In the FIG. 4 modification, the upturned edges are bent twice, while engaging the second and third rolls. Alternatively, separate tooling, such as opposed forming rolls, may be provided in advance of the roll clusters of both modifications to provide the upturned edges.

Figure 5:
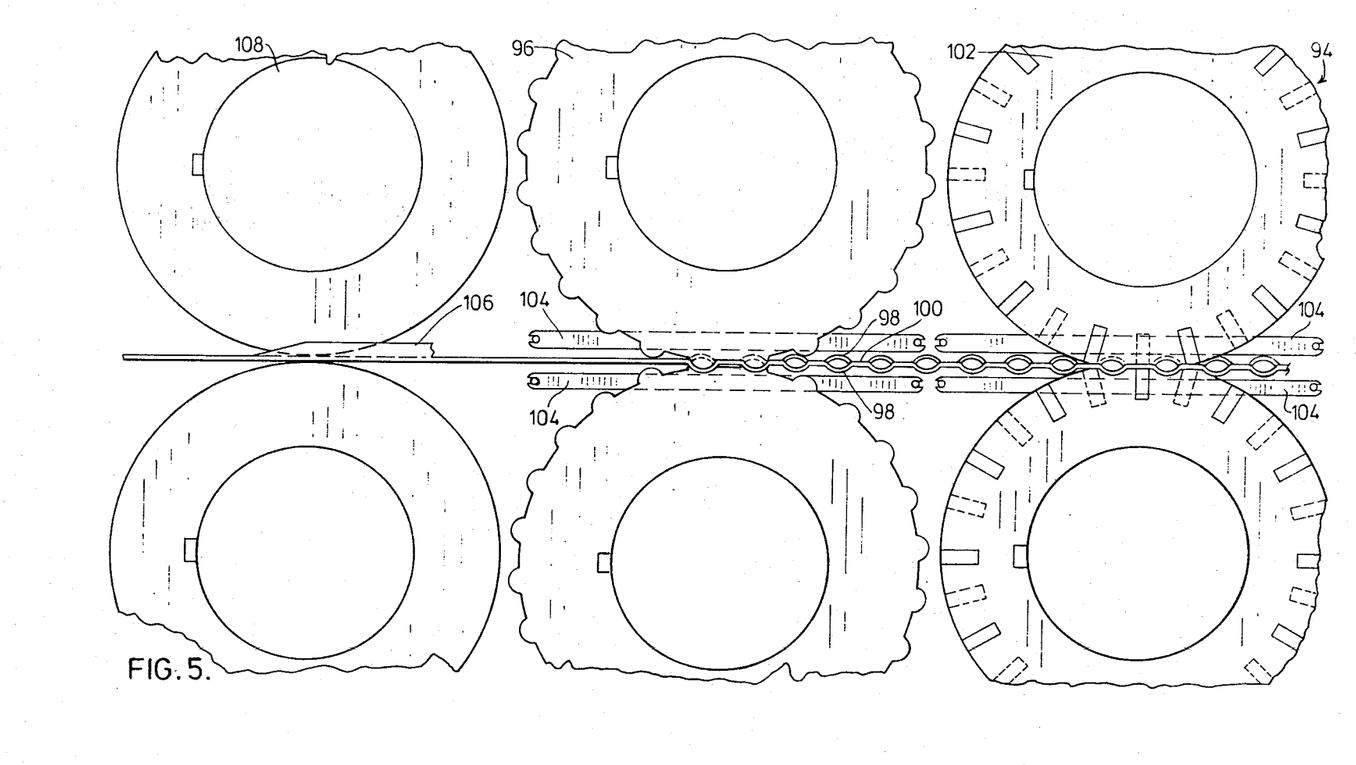
FIG. 5 is a side elevation of a further modification of the slitting and preforming assembly wherein strip is successively acted upon by roll pairs.

Slitting and preforming may also be carried out using an assembly, 94, FIG. 5, in which pairs of rolls are arranged in a line so that moving strip 10 passes through the assembly without being bent. The rolls of pair 96 provide slitting and preforming of slit segments 98 as bands 100 comprising unslit segments are retained in the plane of the strip. The rolls of pair 102 act to complete the slitting which permits lateral opening of mesh diamonds. Conventional stripper bars 104 are used to keep the strip from following the rolls of these pairs. Forming of upturned edges on the lateral edges 106 of the strip may be done using a third pair of rolls 108 which may be placed in advance of the other two pairs. This in-line arrangement has an advantage in that stripping of engaged slit segments is facilitated. Proper registry and surface speed control of the moving strip with the tool faces depend on synchronization and adjustment of external drive means and are more difficult to obtain than the registry and speed control obtained by the cluster of three coacting rolls. Engagement of the tool surfaces with the moving strip is essentially the same in all the modifications.

In the foregoing descriptions, two portions of the width of strip are prepared for lateral expansion by a slitting and preforming operation in which slitting is carried out in two steps. Meshes are formed in two portions of sheet each bounded by a lateral edge portion and a central portion of sheet which is not slit. Without changing the method of the invention, a single strip portion or a plurality of strip portions, each disposed between portions of strip which are not slit, may be prepared for lateral expansion. In the expansion of a plurality of strip portions, unslit portions which are not lateral edges may be guided in a known manner such as by divergence of pairs of silent chains provided with spaced pins which penetrate into or through these unslit portions. The number of components in each slit portion is not critical. The method of slitting and preforming in one step followed by completion of slitting in a second step may be applied to a very narrow slit area comprising only one component spaced between two imperforate border portions.

Figure 13:
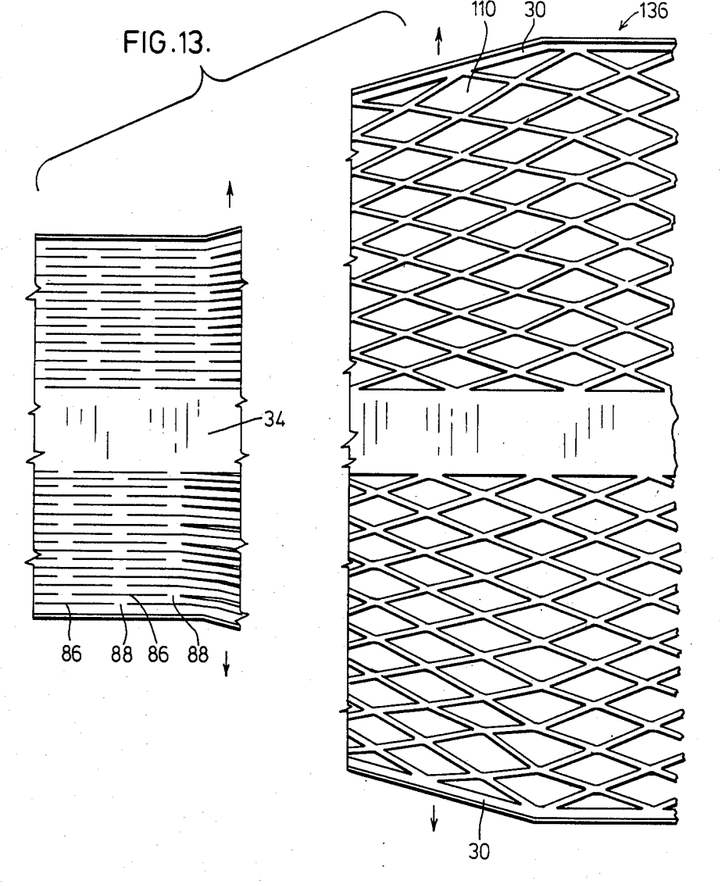
FIG. 13 is a plan of portions of the strip showing transition from completion of slitting to completion of lateral expansion with offset slit segments corresponding to the embodiment illustrated in FIG. 10.
Figure 16:
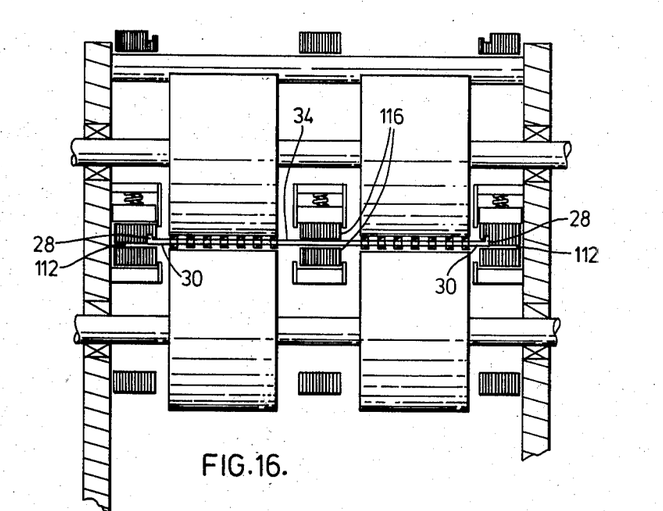
FIG. 16 is an end elevation showing lateral expansion means.
Figure 17:
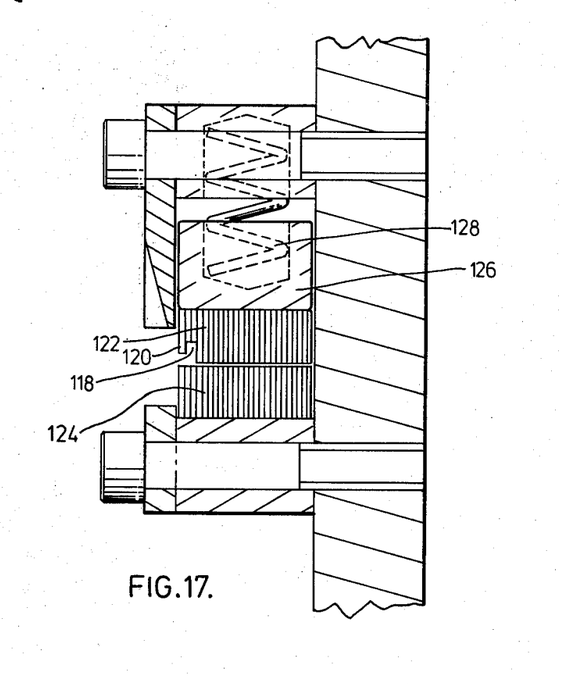
FIG. 17 is an end elevation showing guiding chain detail.

Opening of mesh diamonds 110, FIG. 13, is effected by causing the lateral edges 30 of preformed and completely slit strip to diverge, e.g. by engagement by guiding means such as pairs 112 of silent chains, FIG. 16, moving in diverging paths 114, FIG. 1. If the slitting and preforming operation provides two mesh areas between a central unslit portion 34 and respective lateral edges 30, it is convenient to restrain the central unslit portion 34 against movement to either side as lateral edges 30 diverge. This may be done by pressure engagement between silent chains 116. With this restraint, slit and preformed portions 64 and 66 of the strip do not have to be alike. Various gripping means may be applied to the lateral edges. Preferably, narrow upturned edges 28 formed along lateral portions 30 of the strip are engaged by recesses 118, FIG. 17, in multiple link silent chains. Conveniently, these recesses may be made by cutting away portions of rows of links which are adjacent the innermost row of links 120 of each of two upper chains 122. Enough links, usually two or three, to accommodate the thickness of the strip are cut to a depth which does not expose laterally extending connecting pins. As upturned edge 28 at one side of the strip enters into recess 118 of an endless upper chain 122, a lower chain 124 is brought into pressure engagement with the underside of the strip directly below the upper chain, both chains following the same path during divergence. Preferably one of the chains, upper chain 122 in FIG. 17, rides on a plate 126 which is resiliently biased, e.g. by a plurality of coiled springs 128, towards the chain. Alternatively, the lateral edges of the strip may be troughed by engagement between complementary pairs of rolls, with the troughs being retained by diverging guiding means, or pins attached to the inner edges of the guiding means may penetrate into or through the lateral portions of the strip.

Figure 14:
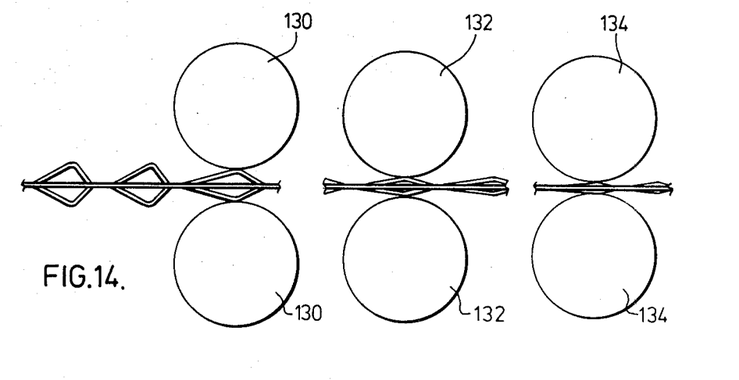
FIG. 14 is a side elevation of the strip as shown in FIG. 13 including flattening rolls.

During divergence of the lateral portions of strip to open mesh diamonds, it is advantageous, particularly with materials such as lead and lead alloys wherein the tensile strength of the bonds is less than the tensile force required to straighten the convexly shaped portions of the components, to provide pressure assistance to move elongated wire segments towards the plane of the strip in a plurality of steps. For example, in the preforming of 1 mm thick strip, the nominal thickness, i.e. the spacing between peaks of elongated wire segments on opposite sides of the strip, may be increased to 6 mm. Passing of laterally expanding strip successively between one or more pairs of rolls, e.g. rolls 130, 132 and 134 in FIG. 14 having, for example, 5, 3, and 2 mm spacings, will bring the wire segments substantially into the plane of completely slit and expanded sheet 136 in a controlled manner. Expansion is effected with less laterally directed force on bonds between mesh strands, this providing effective control against breakage of bonds.

In prior art methods of preparing strip for expansion, it is usual to form the pattern of staggered slits which is essential to permit lateral expansion, either completely or in interrelated steps, in advance of elongations required to compensate for shortening of mesh portions of the strip. During elongation, nodes, each having four attached slit segments, are pushed out of the plane of the strip. On lateral expension, rotational forces act on these nodes. Bending occurs at the nodes during both expansion and subsequent flattening to bring the nodes into the plane of expanded sheet. In the method of the present application, preforming does not move nodes out of the plane of the strip and forces which may damage nodes being returned to the plane of the strip are avoided. Firm holding of bands which extend across the strip and exclusion of nodes from elongated portions provide better control over these portions of strip during slitting and preforming.

In tests in which completely slit strip was preformed by rolls having discs with convexly shaped tool surfaces having the length of a node and two adjacent slit segments plus calculated required elongation, as in the prior art arrangements, we observed a tendency for the spacing between the leading and trailing ends of the slits to decrease, this indicating a shortening of the slit portion of strip relative to the imperforate borders. Apparently the portions of strip components engaging the tool surfaces were partly elongated and partly corrugated or shaped without stretching. In the method of the present invention, in which slit segments only were engaged by convexly shaped tool surfaces, predetermined elongation was substantially completely effected. The method of the patent application thus provides high speed rotary slitting and preforming plus lateral expansion as strip moves continuously through the assembly.

As shown in FIG. 18, battery grids may be obtained from expanded sheet 136 which has been prepared by described modifcations of the invention. Laterally oriented grids 138 and their tabs 140 may be separated from sheet 136 by removal of scrap material 142 between tabs 140, slitting of the strip to separate the ends of the tabs from adjacent grids and cutting of the strip into appropriate grid lengths. Upturned guiding edges 28 may be flattened or may be removed by trimming.

In roll preforming of wires from strip having conventionally staggered rows of slits, no advantage has been shown for the use of discs which have wire elongating portions that are other than symmetrically shaped. In the production of metal lath from steel strip, for example, wires have sufficient tensile strength to permit stretching without localized weakening that may affect their usefulness. In the preforming of lead or lead alloy wire segments on symmetrically shaped tooling surfaces, we have observed that areas of weakness occur near the trailing ends of elongated wire segments as the strip is advanced through the slitting and preforming assembly. As disclosed in detail in copending Canadian Patent Applicaton No. 315,190 filed 10-31-78, we have determined experimentally that the slit segments are more uniformly stressed if the substantially convexly curved tooling surfaces are asymmetrically shaped with their apices in advance of the centre lines between the entry and trailing ends of the tooling surfaces. This asymmetrical shaping is shown most clearly in FIG. 7.

In the slitting, preforming and expanding of two or more portions of strip which are spaced by unslit portions, it is not necessary to provide identical mesh patterns in separate lines such as portions 64 and 66 of FIG.

10. For example, positive grid meshes may be formed in one line and negative grid meshes in another. Engagement of unslit strip portions between the lines of mesh by spring biased silent chains restrains the strip against lateral movement that might otherwise be caused by unequal forces required to open differently sized diamonds.

The process of the present invention provides a number of important advantages. Concurrent slitting of strip material and deformation of strand segments as they are formed substantially avoids breakage of strands due to excess stretching or concentration of stresses at nodes often encountered in sequential operations such as rotary slitting followed by a separate stretching step. Reciprocal forming may permit concurrent slitting and stretching together with mesh expansion but the dimensions of the finished product are sensitive to and dependent on strip material thickness and composition. Variations in mesh final dimensions, not permissible in the manufacture of close tolerance battery grids, thus result from variations in strip thickness when using reciprocating methods. Overall grid dimensions having close tolerances can be produced at higher rates of production using the process of the present invention.

The present process permits forming of profile strip having a variable thickness, such as tapered strip intended to have increased amperage capacity in proximity to the support tabs.

What we claim as new and desire to protect by Letters Patent of the United States is:

1. A method of forming expanded mesh sheet from a deformable strip comprising the steps of concurrently slitting and preforming at least a portion of said strip contained within imperforate border portions to provide one or more longitudinally extending strand-like components, said components comprising elongated slit segments deformed out of the plane of the strip and unslit segments retained in the plane of the strip, said elongated slit segments being severed from laterally adjacent segments and said border portions and being substantially convexly shaped from the plane of the strip whereby slit segments in laterally adjacent components extend from opposite sides of the plane of the strip, and said unslit segments retained in the plane of the strip together define continuous bands extending laterally at least the width of said one or more strand-like components across the said portion of the strip; slitting the strip at alternate bands to extend the slit segments in a staggered relation and to define nodes therebetween; and laterally expanding the slit preformed portion of the strip wherein the nodes remain substantially in the plane of the strip to form said mesh sheet by drawing opposite longitudinal edges of the strip apart whereby the elongated segments form a network of substantially flattened mesh joined by said nodes wherein unslit portions of the bands provide bonds between adjacent components.

2. A method as claimed in claim 1 in which said strip is preformed by elongating said slit segments by pressing substantially convexly curved slit segments out of the plane of the strip while maintaining adjacent bands in the plane of the strip.

3. A method as claimed in claim 2 in which an upturned edge is formed on each longitudinal edge of the said strip.

4. A method as claimed in claim 2 in which said deformable strip is lead or lead alloy.

5. A method as claimed in claim 3 in which said opposite longitudinal edges of the strip are drawn apart by diverging means adapted to engage the said upturned edges.

6. A method as claimed in claim 5 in which the slit segments are flattened by a plurality of pairs of linearly arranged, opposed rolls to provide a substantially planar mesh.

* * * * *